US008752372B2

(12) United States Patent
Ramler et al.

(10) Patent No.: US 8,752,372 B2
(45) Date of Patent: Jun. 17, 2014

(54) REGENERATIVE HYDRAULIC CIRCUIT FOR DUMP TRUCK BIN LIFT CYLINDER

(75) Inventors: Matthew J Ramler, Luxemburg, IA (US); Robb A. Jones, Dubuque, IA (US)

(73) Assignee: Deere & Company, Moline, IL (US)

( * ) Notice: Subject to any disclaimer, the term of this patent is extended or adjusted under 35 U.S.C. 154(b) by 1062 days.

(21) Appl. No.: 12/784,725

(22) Filed: May 21, 2010

(65) Prior Publication Data

US 2011/0283693 A1 Nov. 24, 2011

(51) Int. Cl.
*F16D 31/02* (2006.01)
*F15B 11/08* (2006.01)

(52) U.S. Cl.
USPC ............................................ 60/461; 91/437

(58) Field of Classification Search
USPC ..................................... 60/461; 91/436, 437
See application file for complete search history.

(56) References Cited

U.S. PATENT DOCUMENTS 3,523,490 A 8/1970 Blanchetta
4,216,702 A 8/1980 Brundidge et al.
4,691,792 A 9/1987 Shintani
4,976,106 A 12/1990 Noerskau et al.
5,220,862 A * 6/1993 Schexnayder .................. 91/436
6,568,763 B2 5/2003 Uematsu et al.
6,880,332 B2 * 4/2005 Pfaff et al. ...................... 60/460
7,487,707 B2 2/2009 Pfaff et al.
7,495,185 B2 2/2009 Takeda et al.
7,604,300 B2 10/2009 Whitfield, Jr. et al.

FOREIGN PATENT DOCUMENTS

EP 1213486 A2 11/2001

OTHER PUBLICATIONS

Swedish Office Action dated Feb. 24, 2012, with English translation of portions thereof, 10 pages.

* cited by examiner

*Primary Examiner* — Michael Leslie

(57) ABSTRACT

An articulated dump truck is provided with an electro-hydraulic bin control system including a proportional control valve for the bin lift cylinders and including a solenoid-operated regenerative valve assembly mounted adjacent the lift cylinders and being actuated, during lifting the bin for dumping a load of material from the bin, to cause a regenerative flow to occur when the force required by the bin lift cylinders to continue lifting the bin falls to a predetermined force. The force required for tilting the bin is continuously calculated by an electronic control unit taking into account a sensed bin load, a sensed bin tip amount and a sensed side-to-side inclination of the bin. In a simplified second embodiment, the proportional control valve controls the regenerative flow.

11 Claims, 3 Drawing Sheets

REGENERATIVE HYDRAULIC CIRCUIT FOR DUMP TRUCK BIN LIFT CYLINDER

FIELD OF THE INVENTION

The present invention relates to dump trucks, and more specifically relates to hydraulic circuits for controlling the operation of one or more lift cylinders for the bins of such trucks.

BACKGROUND OF THE INVENTION

Articulated dump trucks have a unique configuration that includes bin lift cylinders positioned such that it requires the force exerted by the cylinders to be much greater at the beginning than for the ensuing portion of an operation for dumping a loaded bin. Stated otherwise, the hydraulic pressure required by the cylinders to dump the load proportionally decreases as the bin is raised.

A known dump truck has a bin that is lifted to a maximum tipping angle of approximately seventy degrees from the horizontal during the bin dumping operation. When the bin of this known dump truck has been tipped an amount approximating 50% of the maximum tipping angle, the force required is roughly half the force the cylinder is required to provide to lift the bin at the beginning of the dumping operation.

Some dump truck designs use multi-stage lift cylinders to take advantage of the fact that decreasing force is required as lift increases. A multi-stage cylinder at initial extension provides high force at low speed. As the cylinder extension continues and the additional stages are activated, speed increases and force decreases. Thus, faster bin raise times are realized.

The problem with multi-stage cylinders is that they are more expensive and prone to leaks and other problems versus a single stage cylinder.

The problem to be solved then is how to efficiently utilize the operating pressure fluid that is routed to the lift cylinders during dumping a dump truck bin so as to minimize the amount of time it takes to dump a loaded dump truck bin without increasing the size of the pressure fluid supplying pump and the plumbing required beyond that used in systems using single stage cylinders, or to make it possible to decrease the size of the pump without sacrificing dump speed.

SUMMARY OF THE INVENTION

According to the present invention, there is provided an improved control for dump truck bin dumping cylinders, and more specifically, there is provided an improved control system for such cylinders.

An object of the invention is to provide a control system which controls the flow of pressure fluid from a given pump to the bin lift cylinder(s) so that the speed of dumping is increased, or such that a pump significantly smaller than said given pump may be used which is able to lift the bin at a speed equal to that produced by the given pump when flow to the bin lift cylinder(s) is conventionally controlled.

Specifically, the foregoing object is achieved by providing an electro-hydraulic control system embodying a control valve arrangement operable for supplying fluid to the bin lift cylinder(s) at a high pressure and low flow during a first part of a dump truck bin dumping operation, and thereafter being operable, in response to a predetermined bin weight or bin tip angle, to provide a regenerative flow between rod and head ends of the bin lift cylinders so as to increase the speed of extension of the cylinders.

More specifically, the foregoing object is achieved by providing an electro-hydraulic control system including a solenoid-operated regenerative valve which is biased to a non-regenerating position when the force required to lift the dump truck bin is above a predetermined force, but which is responsive to an electrical signal representing a lifting force equal to, or less than, said predetermined force to move to a regenerative position connecting the rod ends of the cylinders to the head ends of the cylinders, which are also connected for receiving fluid from a supply pump. Still more specifically, the control system includes an electrical control unit forming part of an on-board weighing system including sensors for sensing the weight imposed on the bin pivot assembly by the load contained in the bin, for sensing the bin tip position and for sensing the inclination of the bin, the calculated weight being compared with a predetermined weight placed in the memory of the control unit with a control signal being sent to the regeneration valve to cause it to shift to a regenerative position when the calculated weight equals or is less than the predetermined weight.

This and other objects will become apparent from a reading of the ensuing description together with the appended drawings.

DESCRIPTION OF THE PREFERRED EMBODIMENT

Figure 1:
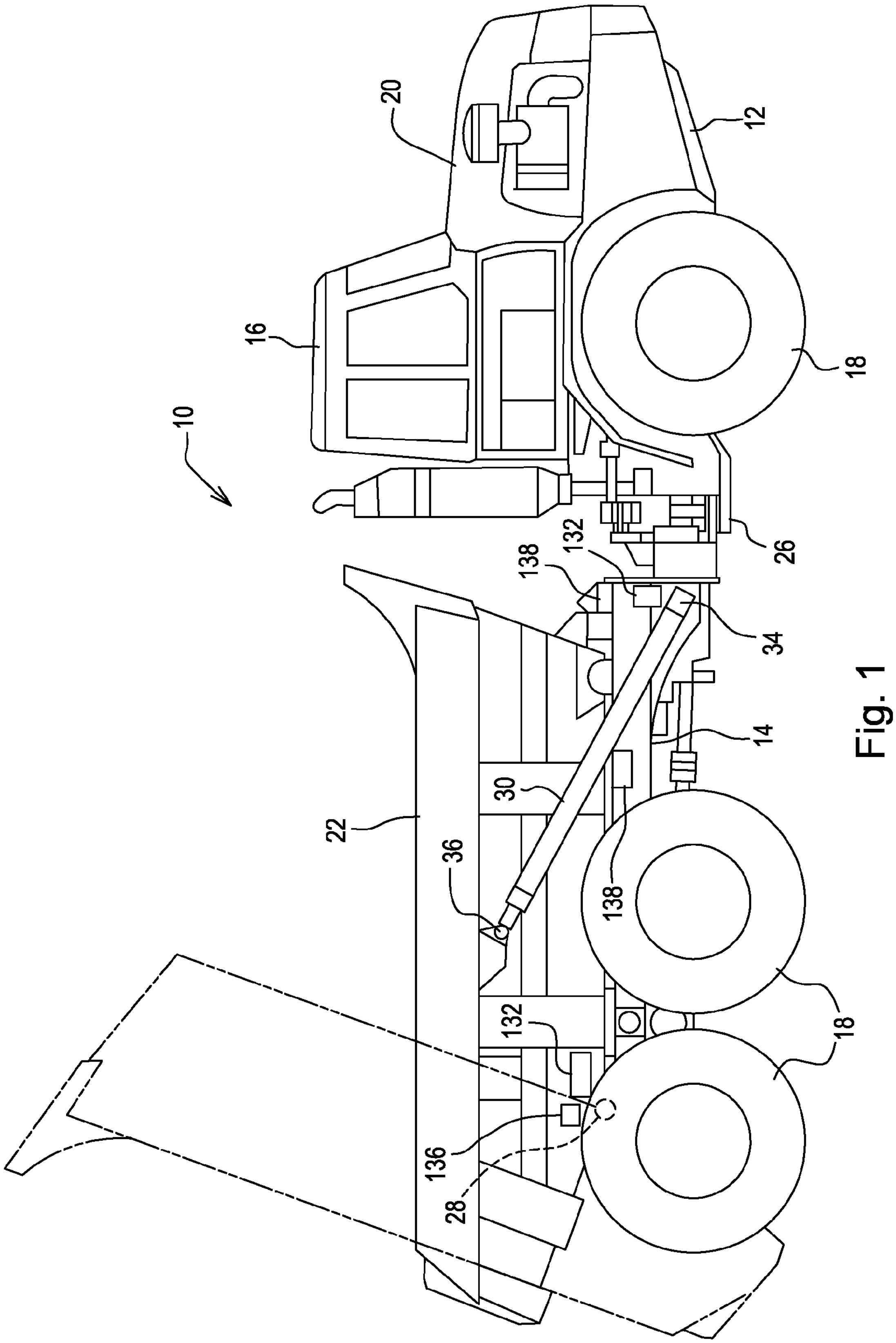
FIG. 1 is a right side elevational view of an articulated dump truck with which the present invention is particularly adapted for use, showing the bin in a normal, loading position, in solid lines, and showing the bin in a fully raised, dump position, in broken lines.

Referring now to FIG. 1, there is shown an articulated dump truck 10 comprising an articulated frame including front and rear frame sections 12 and 14, respectively, an operator cab 16, a plurality of drive wheels 18 to propel the dump truck 10 over the ground, an engine (not shown) located within an engine compartment 20 to power operation of the dump truck 10, and a bin 22 for holding material to be hauled. The cab 16 is mounted on the front frame section 12. The front and rear frame sections 12 and 14 are pivotally coupled to each other through an articulation joint 26.

The bin 20 is mounted to a rear region of the rear frame section 14 for pivoting vertically about a horizontal transverse axis defined by right and left coupling pin assemblies 28. Right and left, single stage bin lift cylinders 30 and 32 (see FIG. 2) are respectively provided at the opposite sides of the rear frame section 14, with the cylinders 30 and 32 each having a head end pivotally coupled, as at pins 34, to a lower front region of the rear frame section 14 and having a rod end coupled, as at pins 36, to an upper central region of the bin 22. When the lift cylinders 30 and 32 are in a fully retracted position, the bin 22 is in a completely lowered loading position wherein a bottom of the bin overlies and is supported by the rear frame section 14, as shown in FIG. 1. When the lift cylinders 30 and 32 are fully extended, the bin 22 is pivoted upwardly about the coupling pin assemblies 28 so that the bottom of the bin 22 makes a tipping angle of approximately 70° with respect to the horizontal.

Figure 2:
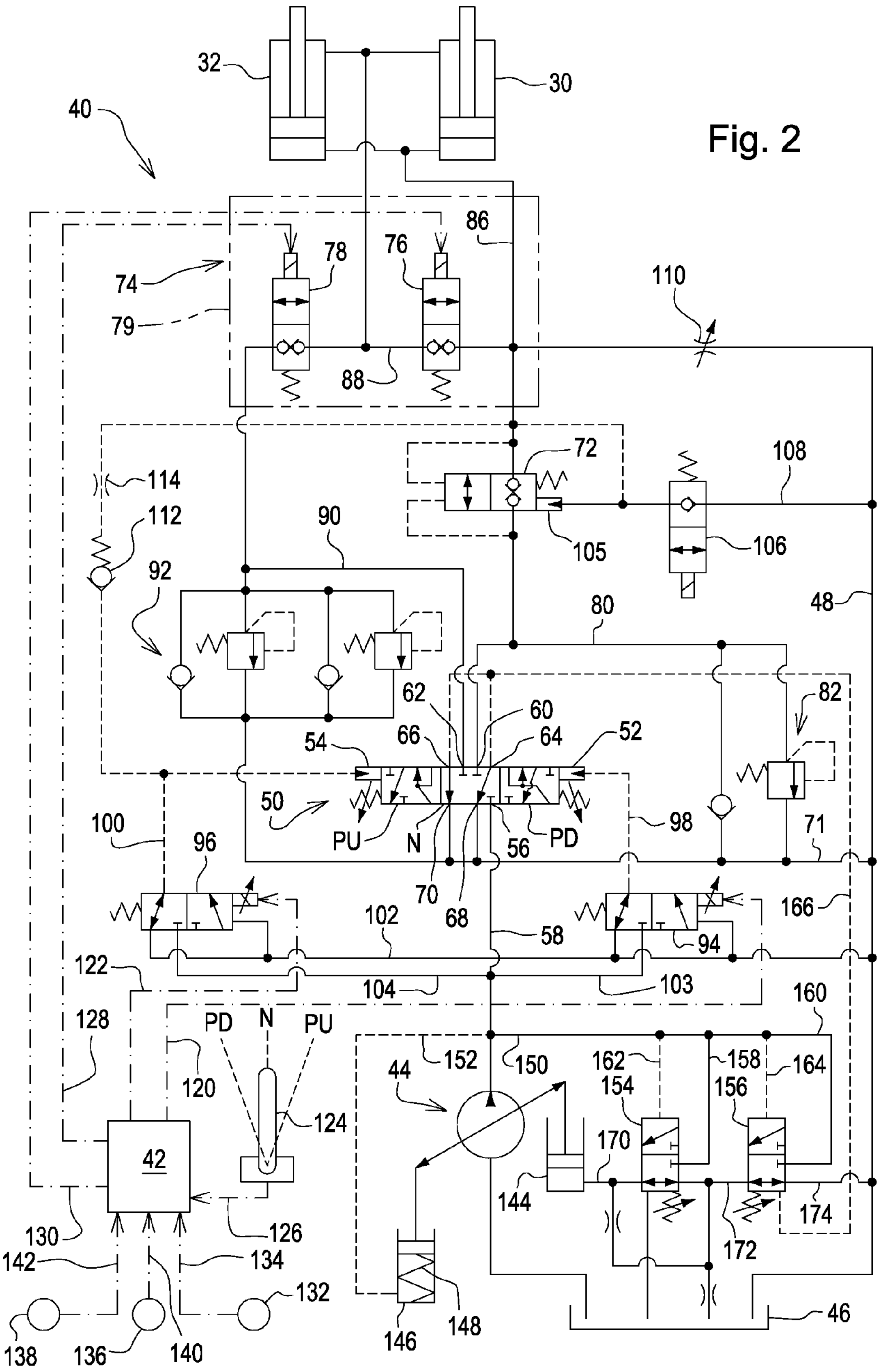
FIG. 2 is a schematic of a bin lift cylinder control system constructed in accordance with a first embodiment of the invention.

Referring now to FIG. 2, there is shown a bin lift cylinder control system 40 for controlling the operation of the bin lift cylinders 30. The control system 40 includes an electronic control unit 42 that receives inputs from various sources and provides commands or other outputs to various components of the system based on logic stored in the control unit 42 and on the received inputs. The control system 40 includes a pressure source here shown as a load responsive, variable displacement pump 44 that is coupled for drawing hydraulic fluid from a hydraulic fluid tank 46 that contains hydraulic fluid and receives hydraulic fluid circulated back to the tank from the lift cylinders 30 and 32 and other hydraulic components of the circuit by way of a branched drain line 48.

Central to the control of the lift cylinders 30 is a pilot-operated proportional directional control valve 50. The control valve 50 is in the form of a spool valve which may be shifted among three positions. The control valve 50 is shown in a centered, neutral position N to which it is normally biased by right and left, adjustable centering springs. The control valve 50 may be shifted to the right, from the neutral position, to a power up position PU by sending pilot fluid pressure to a right controller 52, and may be shifted to the left, from the neutral position, to a power down position PD by sending pilot fluid pressure to a left controller 54. The pump 44 is connected to a pressure supply port 56 of the control valve 50 by a pressure supply line 58, the port 56 being blocked from fluid communication with right and left actuator ports 60 and 62, respectively, when the control valve is in the neutral position. Respectively located rightward and leftward of the actuator ports 60 and 62 are load pressure ports 64 and 66 which, in the neutral position of the control valve 50, are respectively coupled to drain ports 68 and 70 that are each connected to a first branch 71 of the drain line 48.

Mounted for controlling the flow of fluid between the control valve 50 and the bin lift cylinders 30 and 32 are a pilot pressure operated load holding valve 72, here shown in a normal load holding position blocking flow through the valve 72, and a regeneration valve assembly 74 comprising right and left, solenoid-operated poppet valves 76 and 78, respectively, here shown in deactivated closed positions wherein flow is blocked from passing through the poppet valves. The poppet valves 76 and 78 are contained within a valve body 79, shown schematically as a functional box which is separated from a remainder of the control system 40 and being preferably located on the rear truck frame section 14 in the vicinity of the lift cylinders 30 and 32 so that, due to increased flow occasioned by regeneration operation, only the size of the fluid lines extending between the valve assembly 74 and the lift cylinders need to be sized to handle regenerative flow, as is explained below in more detail.

The right actuator port 60 is coupled to a first branched supply/return line 80 connected, on the one hand, to a high pressure relief valve 82 which is operable at a predetermined pressure to connect the line 80 to the first branch 71 of the drain line 48, and connected, on the other hand, to the load holding valve 72, that, in turn, is connected to the head ends of the bin lift cylinders 30 and 32 by a second branched supply/return line 86. With the holding valve 72 located in the illustrated load holding position, the flow of fluid to and from the head ends of the lift cylinders 30 and 32 is blocked. The supply/return line 86 is also connected to the right solenoid-operated poppet valve 76 which, when in its illustrated deactivated closed position, blocks flow to and from a branched supply/return line 88 connected, on the one hand, between the poppet valves 76 and 78, and on the other hand, to the rod ends of the lift cylinders 30 and 32. The left actuator port 62 is connected to a third branched supply/return line 90 having a first connection with a tandem set of pressure relief valves 92 which open at a predetermined pressure to permit flow to the first branch 71 of the drain line 48. The supply/return line 90 is also connected to the poppet valve 78, which, when closed as illustrated, blocks flow between the supply/return lines 90 and 88, and, hence, blocks flow between the control valve 50 and the rod ends of the cylinders 30 and 32.

Right and left, solenoid-operated, pilot pressure control valves 94 and 96, respectively, are provided for controlling the flow of pilot pressure fluid to and from the right and left controllers 52 and 54 of the control valve 50. The valves 94 and 96 are two-position valves, and each is shown in a normal deactivated pressure-relieving position to which they are biased by respective springs. When in the pressure-relieving position, the valves 94 and 96 establish respective fluid paths coupling pilot pressure lines 98 and 100, which are respectively coupled to the controllers 52 and 54, to a second branch 102 of the drain line 48. At the same time, the control valves 94 and 96 block fluid from flowing to the pilot pressure lines 98 and 100 respectively from first and second branches 103 and 104 of the pressure fluid supply line 58 extending from the pump 44 to the pressure port 70 of the bin cylinder control valve 50. When solenoids of the pilot pressure control valves 94 and 96 are activated, the control valves each shift to the left to a pressure-supplying position wherein the pressure supply branch lines 103 and 104 are respectively coupled to the controllers 52 and 54 of the control valve 50, with the controllers being blocked from fluid communication with the drain line branch 102, and, hence, from fluid communication with the tank 46. In addition to being connected to the controller 54 of the valve 50, the pilot pressure line 100 is connected to the supply/return line 86, to a controller 105 of the load holding valve 72 and to a solenoid-operated anti-cavitation valve 106 that is coupled in a second branch 108 of the drain line 48, the valve 106 containing a one-way check ball which prevents flow in the direction of the drain line 48 when the valve 106 is in a deactivated condition, as shown, but permits fluid to be drawn in by the cylinders 30 and 32 during lifting the bin 22 in the event that a condition arises resulting in the pistons accelerating upwardly faster than fluid is being added to the head ends. Activation of the valve 106 results in the draining of pilot control fluid from the controller 105. It is noted that excess control fluid is metered to drain by way of a variable restrictor 110 provided in the drain line 48 between the tank 46 and the supply/return line 86. It is further noted that the pilot pressure line 100 contains a one-way check valve 112 located between the valve controller 54 and the valve controller 105, with a restrictor 114 being located just downstream from the check valve 112.

Proportional control signals are selectively provided for activating the pilot pressure control valves 94 and 96 by the electronic control unit 42, with an output signal lead 120 extending between the control unit 42 and the solenoid of the control valve 94, and with an output signal lead 122 being connected between the control unit 42 and the solenoid of the control valve 96. The magnitude of the signal sent for controlling the pilot pressure control valves 94 and 96 is determined, in part, by a manually-operated joystick 124 that is located in the operator cab 16 for initiating control of the bin lift cylinders 30 and 32. The amount of movement input to the joystick 124 for initiating operation of the bin lift cylinders 30 and 32 is sensed by a potentiometer which generates a signal corresponding to the amount of joystick movement, with this signal being sent to the control unit 42 over a joystick input lead 126. The regeneration valve assembly 74 is also required to be actuated for controlling operation of the cylinders 30 and 32 and for achieving this actuation the respective solenoids of the poppet valves 76 and 78 are connected to the electrical control unit 42 by right and left poppet signal output lines 128 and 130, respectively, which are activated in accordance with the condition commanded by the movement of the joystick 124.

As described in more detail below, the right poppet valve 76 is activated only during power up operation when a regeneration mode is desired. A regeneration mode is desired when lifting the bin 22 so that the lift cycle may be shortened by causing the lift cylinders 30 and 32 to extend faster. Under normal circumstances, it has been found that the force required to initially lift the bin 22 is approximately twice that which can be produced during the regeneration mode. However, it has further been found that the disclosed geometry and pivotal mounting of the bin 22 together with the changing bin disposition and the dumping of loaded material during raising of the bin results in the force requirement to dump the bin decreasing to about half that initially required after the bin has been raised through approximately half the total designed tip angle. Further, it has been found that a regeneration mode would be effective to speed up the extension of the cylinders 30 and 32 once the force requirement has dropped to a predetermined force which is about half the maximum force requirement initially required to lift the loaded bin 22.

In order to accurately discern when the regeneration mode would be effective for speeding up the extension of the bin lift cylinders 30 and 32, the electronic control unit 42 is programmed to determine the load exerted on the cylinders during lifting operation by effectively functioning as part of an on-board weighing system and using the determined weight to calculate a force required to be exerted by the cylinders 30 and 32 to tilt the bin 22 upwardly, this force being compared with the predetermined force, with the control unit 42 acting to send a control signal to the poppet valve 76 only after the calculated force becomes substantially equal to the predetermined force. In order for the control unit 42 to be able to compute the weight of the load carried in the bin, it is provided with three input signals representing three different variables impinging on the weight to be calculated. Specifically, a weight sensor 132, which here represents a combination of four individual strain gauges respectively located at each of the pivot pins 28 and 34 for sensing the strain resulting from the weight exerted by the bin load on the pivot pins once the lift cylinders 30 and 32 pivot the bin away from the frame section 14, weight sensor 132 generating a corresponding weight signal which is input to the control unit 42 by way of a measured weight signal lead 134. Since fore-and-aft and side-to-side inclinations of the bin 22 skew the weight sensed by the sensor 132, a tip position sensor 136 and an inclinometer 138 are provided on the frame section 14, with the tip position sensor 136 being a potentiometer associated with one or the other of the bin pivot pins 28 and being operable for generating a tip signal which is input to the control unit 42 over a tip signal lead 140, and with the inclinometer 138 generating an inclination signal which is input to the control unit 42 over an inclination signal lead 142. Thus, the control unit 42 makes a weight calculation using the signals indicating the measured weight of the bin 22, together with the bin inclination and tip position signals, this weight calculation being used to arrive at a calculation of the force required to be exerted by the cylinders 30 and 32 in order to dump the bin 22.

The load responsive, variable displacement pump 44 includes a displacement control device here depicted as an arm having first and second, single-action hydraulic control cylinders 144 and 146, respectively, at right and left ends of the arm, with the control cylinders 144 and 146 thus working in opposition to each other in effecting pump displacement adjustments. Also acting in opposition to the first control cylinder 144 is a biasing spring 148 located within the second control cylinder 146 and establishing a minimum pump displacement at which the pump delivers a maximum pressure.

The displacement of the pump 44 is governed by a load demand placed on the pump 44 by the bin cylinders 30 and 32 and, for this purpose, third and fourth control pressure branch lines 150 and 152, respectively, are connected to the control pressure line 108, with the branch line 150 having a parallel connection with first and second pump displacement control valves 154 and 156, respectively, established by lines 158 and 160. As illustrated, respective pilot control pressure lines 162 and 164 are connected between the pump supply pressure branch line 150 and upper ends of the pump displacement regulating valves 154 and 156, while a load pressure line 166 is connected between the load pressure ports 64 and 66 of the bin lift cylinder control valve 50 and the bottom of the regulating valve 156. The pump displacement control valves 154 and 156 are each shown biased upwardly by a variable regulating spring to a normal drain position in which they connect a chamber of the right displacement control cylinder 144 to the drain line 48 by way of a first fluid line 170 connected between the cylinder 168 and the regulator valve 154, a second fluid line 172 connected between the displacement control valves 154 and 156, and a fourth branch line 174 of the drain line 48.

Operation of the articulated dump truck 10 is as follows. Once the bin 22 has been loaded with a desired material, it is driven to a selected off-load site. The on-board weighing system will be energized, with the weight sensor 132 sensing the material weight and sending a corresponding weight signal to the control unit 42, with the tip sensor 136 sensing the bin tip and providing a corresponding signal to the control unit 42 and with the inclinometer 138 sensing the side-to-side inclination of the bin 22 and providing a corresponding signal to the control unit 42. The control unit 42 uses the measured weight signal, the tip signal and the inclination signal to calculate a true weight of the loaded material, this calculated weight being used to determine the amount of force required by the bin cylinders 30 and 32 to continue lifting the bin. The force calculated by the control unit 42 is compared with a predetermined force value stored in the control unit, the predetermined force value being that at which regeneration flow will be effective for increasing the dump speed. Initially, the determined force will be substantially greater than the predetermined force and no signal will be sent by the control unit 42 for actuating the regeneration valve assembly 74. Concurrent with energizing the on-board weighing system, the operator will displace the joystick 124 in a direction for effecting dumping of the bin 22. This results in a dump signal being sent to the control unit 42 by way of the lead 126, the control unit 42, in turn, sending a proportionate signal to the left pilot-pressure control valve 96 by way of the output lead 122 and in a signal being simultaneously sent to the solenoid-operated poppet valve 78 by way of the output lead 128. This causes the left pilot pressure control valve 96 to shift to the left against its bias spring, resulting in the supply/pressure branch line 104 being coupled to the pilot pressure line 100 so as to supply a proportionate pilot pressure to the left controller 54 of the bin cylinder control valve 50. This results in the control valve 50 shifting to the right to the power up position PU where the pressure supply line 58 is connected to the actuator port 60 and load pressure port 64, and, thus, respectively to the supply/return line 80 and to the load pressure line 166. The supply/return line 80 supplies pressure to the left end of the load holding valve 72 and causes it to shift to the right so as to interconnect the supply/return line 80 and the supply/return line 86, thus, establishing a connection of hydraulic fluid pressure with the head ends of the bin lift cylinders 30 and 32. Simultaneously with energizing the pilot pressure control valve 96, the control unit 42 energizes the solenoid of the left poppet valve 78 causing it to shift downwardly and interconnect the supply/return line 88 with the supply/return line 90, thereby connecting the rod end of the cylinders 30 and 32 with the cylinder port 62, which is connected to the branch 71 of the drain line 48. Thus, with pump 44 and tank 46 respectively being connected to the head ends and rod ends of the cylinders 30 and 32, the cylinders 30 and 32 will begin to raise the bin 22 once sufficient fluid pressure is delivered by the pump 44. The control unit 42 continues to calculate the force required to be exerted by the cylinders 30 and 32 to lift the bin 22 as the material is unloaded, this calculated force being continually compared with the stored predetermined force. Upon the calculated force becoming substantially equal to the predetermined force, the control unit 42 sends a regenerative flow signal over the output lead 130 to the solenoid of the right poppet valve 76 while terminating the output signal sent over the output lead 128 to the poppet valve 78. This causes the left poppet valve 78 to close while the right poppet valve 76 opens to establish a regeneration condition wherein the fluid discharged from the rod ends of the cylinders 30 and 32 is directed to the head ends of the cylinders. In one known dump truck hydraulic system, during regeneration operation, the pump supplies a full flow of 80 GPM to the head ends of the cylinders while the rod ends of the cylinders supply a flow of 120 GPM for a total of 200 GPM. With this known system, the regeneration flow is triggered when the tip position of the bin 22 is approximately 50% of the maximum bin tip. Therefore, a dumping speed increase of approximately 30% is realized.

Once the bin 22 has been dumped, a return to its normal position, where the tilt angle is zero, may be achieved by moving the joystick 124 in a direction for placing the control valve 50 in the power down position PD. Thus, by appropriately moving the joystick 124, the right solenoid-operated pilot pressure control valve 94 is activated, while the left pilot pressure control valve 96 and the right control valve 76 are deactivated. This results in the pressure supply line 58 being connected to the right controller 52 of the control valve 50 causing it to shift towards the left so as to place the pressure supply port 56 in communication with the let actuator port 62, and to place the right actuator port 60 in communication with the right drain port 68. At the same time the left poppet valve 78 will be activated by a signal sent from the control unit 42 so that a flow path is established between the actuator port 62 and the rod ends of the lift cylinders 30 and 32, with pressure fluid in the head ends of the lift cylinders being connected to the supply/return line 86 where it acts to open the load holding valve 72 thereby connecting the head ends of the cylinders with the supply/return line 80, actuator port 60 and drain port 68. The cylinders 30 and 32 will then contract to place the bin 22 in its lowered position wherein the tip angle is zero.

Figure 3:
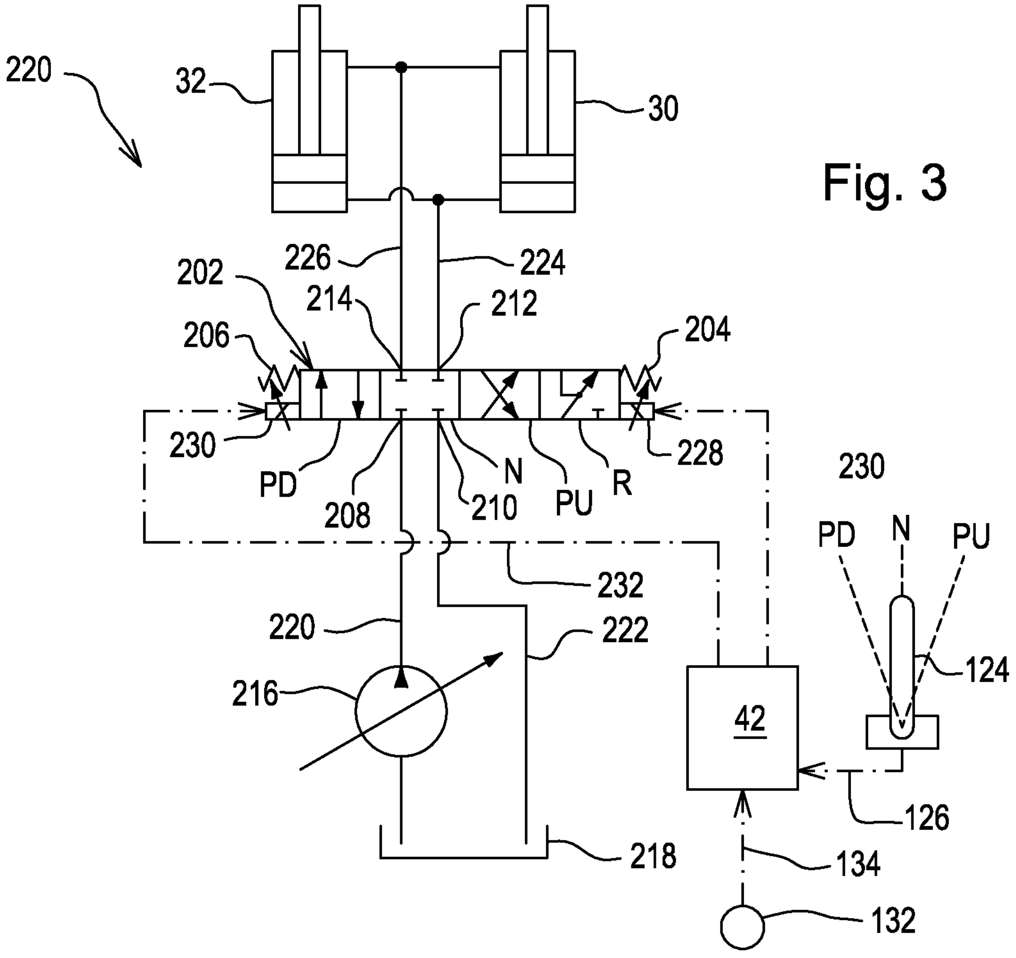
FIG. 3 is a schematic of a bin lift cylinder control system constructed in accordance with an alternate embodiment of the invention.

Referring now to FIG. 3, there is shown an alternate electro-hydraulic control circuit 200 for controlling the bin lift cylinders 29 and 30. Specifically, in addition to being a simplified version of the previously described control circuit 40, the circuit 200 primarily differs from circuit 40 in that the proportional control valve 50 is replaced by a solenoid-operated proportional directional control valve 202, which serves in place of the regeneration valve assembly 74 to control regenerative flow and for this purpose includes a regenerative flow control arrangement defined by a regeneration position R as one of its operative positions, and in that the on-board weighing arrangement is omitted in favor of making an assumption that only 50% of the full cylinder force required during initial lifting of the bin for dumping a load is required after the bin is tipped 50% of its full tipping angle and that at 50% of the full cylinder force a regenerative flow would become effective to increase the speed of extension of the bin lift cylinders.

Thus, the control valve 202 includes a neutral position N to which the valve is biased by centering springs 204 and 206 respectively acting on right and left ends of the valve. In the neutral position, pressure and drain ports 208 and 210, respectively, of the control valve 202 are blocked from right and left actuator ports 212 and 214. The pressure and drain ports 208 and 210 are respectively coupled to a variable displacement pump 216 and to a tank 218 by a pressure supply line 220 and a drain line 222, and the actuator ports 212 and 214 are respectively coupled to the head and rod ends of the cylinders 30 and 32 by branched pressure/return lines 224 and 226. The control valve 202 may be shifted rightward to a power down position PD by energizing a solenoid 228 provided at the right end of the valve, and may be shifted leftward to a power up position PU by energizing a solenoid 230 at the left end of the valve with a first amount of current, and may be shifted to a left extreme position which is the regeneration position R by energizing the solenoid 210 with second current amount greater than the first amount of current. In the power down position PD, the pressure port 208 of the control valve 202 is connected to the left actuator port 214, thereby establishing a fluid connection between the pump 216 and the rod ends of the cylinders 30 and 32, while the drain port 210 is connected to the actuator port 212, thereby establishing a fluid connection between the tank 218 and the head ends of the cylinders 30 and 32. In the power up position PU, the pressure port 208 is connected to the actuator port 212 and the drain port 210 is connected to the actuator port 214, thereby establishing a fluid connection between the pump 216 and the head ends of the cylinders 30 and 32, and establishing a fluid connection between the tank 218 and the rod ends of the cylinders 30 and 32. In the regenerative position R of the control valve 202, the pressure port 208 remains connected to the actuator port 212, but is additionally coupled to the actuator port 214, with the drain port 210 being blocked from the actuator ports, thereby establishing a regenerative flow connection between the rod and head ends of the cylinders 30 and 32.

As with the previously described embodiment, operation of the bin lift cylinders 30 and 32 is initiated by the operator manipulating a lever 124 located in the cab 16, with movement of the lever 124 being sensed by a potentiometer that generates a signal proportional to the lever movement and sends this signal to the control unit 42 by the control input lead 126. A signal for energizing the solenoid 210 for shifting the control valve 202 to the power up position is initiated by moving the lever 124 to the PU position resulting in a proportional signal being sent to the control unit 42 by the input signal lead 126, the control unit then acting to send a control output signal to the solenoid 210 of the control valve over the output signal lead 232. As with the pump 44 of the first embodiment, the displacement of the pump 216 adjusts with demand. Since maximum force is required for initially lifting the loaded bin 22, the displacement of the pump is at a low value, with the supplied pressure being at a high value. With the control valve 202 being located in the power up position PU, the high pressure fluid delivered by the pump 216 is routed to the head ends of the cylinders 30 and 32 while the cylinder rod ends are connected to the tank 218. As the bin 22 tips upwardly about the pivot pin arrangement 28, the tip sensor 132 senses the tip angle and sends a corresponding tip angle input signal to the control unit 42 by way of the input signal lead 134. Stored in the control unit 42 is a tip angle value which corresponds to that angle at which the force required to continue lifting the bin 22 is about half that which is required initially. Assuming that it has been determined empirically that this condition occurs when the bin angle reaches approximately 50% of the bin angle at full raise, the control unit 42 will compare the sensed angle with the stored angle and will act when these angles are approximately equal to send an increased electrical signal to the solenoid 210, by way of the output signal lead 232, to cause additional leftward movement of the control valve 202 so as to position the valve in the regenerative position R. The fluid exiting the rod ends of the cylinders 30 and 32 will then be routed to the head ends resulting in the speed of the extension of the cylinders 30 and 32 being increased such that an approximately 30% increase in dumping speed is realized.

Once the bin 22 is fully raised and dumped, a signal for energizing the solenoid 228 for shifting the control valve 202 to the power down position can be initiated by moving the lever 124 to the PD position resulting in a proportional signal being sent to the control unit 42 by the input signal lead 126, the control unit then acting to send a control output signal to the solenoid 228 over the output signal lead 230.

It is here noted that the pump 44 could be replaced by a pump having a maximum displacement that is 30% less than that of the pump 44, in which case the raise speed would remain the same as that which can be achieved by the pump 44 operating without a regenerative flow control valve. Thus, an advantage would be realized in cost savings because of the smaller pump, however, no advantage in bin dumping speed would be realized.

Having described the preferred embodiment, it will become apparent that various modifications can be made without departing from the scope of the invention as defined in the accompanying claims.

The invention claimed is:

1. An electro-hydraulic control system for controlling an operation of at least one hydraulic lift cylinder coupled for tipping a loaded bin upwardly about a pivot axis for dumping a load from the bin, the control system comprising: a source of pressure fluid; a fluid tank; a control valve arrangement coupled for controlling the flow of pressure fluid to, and return fluid from, said at least one lift cylinder and including a regenerative flow control arrangement responsive to a regenerative flow signal for coupling the rod end of the at least one hydraulic lift cylinder to the head end when the cylinder force required to continue movement of the bin to a fully dumped position decreases to a preselected cylinder force which is substantially less than an initial cylinder force required for lifting said bin at a beginning of a dumping operation; an electronic control unit including a memory containing a stored predetermined bin condition value including a bin tip angle corresponding to when said cylinder force requirement is equal to said preselected cylinder force; and a bin condition sensor arrangement being operative to sense the bin tip angle and to provide to said control unit with a tip angle signal representing a sensed bin tip angle and a weight signal representing a sensed weight of material in the bin, said control unit comparing said sensed tip angle signal with said stored predetermined bin condition value that includes said bin tip angle, with said control unit sending said regenerative flow signal to said control valve arrangement for causing said regenerative flow through said regenerative flow control arrangement in response to the sensed bin condition signal equaling said stored predetermined bin condition value.

2. The electro-hydraulic control system, as defined in claim 1, wherein the bin, lift cylinder and pivot axis are so located geometrically to one another that, when said bin is lifted to a position approximately half way between beginning and fully dumped positions of the bin, approximately 50% of the bin load remains, with said predetermined force being calculated based on 50% of a full bin load; with said regenerative flow signal being sent when said tip angle sensor senses a tip angle equal to 50% of a full tip angle of said bin.

3. The electro-hydraulic control system, as defined in claim 1, wherein the control valve arrangement is a solenoid-operated proportional directional control valve shiftable among neutral, power down, power up and regenerative positions, with said control valve moving from said power up position to said regenerative position only when said proportional directional control valve receives said regenerative signal from said control unit.

4. The electro-hydraulic control system, as defined in claim 1, wherein said control valve arrangement includes a pilot-pressure operated proportional directional control valve and a solenoid-operated pilot pressure control valve arrangement coupled for selectively sending pilot control pressure to opposite ends of said directional control valve; and said regenerative control valve arrangement being located between said directional control valve and said at least one lift cylinder and being solenoid-operated, with said control unit being coupled for sending an operating signal to said pilot pressure control valve arrangement, and for sending said regenerative flow signal to said regenerative control valve arrangement.

5. The electro-hydraulic control system, as defined in claim 4, wherein said pilot pressure control valve arrangement comprises a pair of solenoid-operated pilot pressure control valves, respectively coupled to opposite ends of said directional control valve for either connecting both of said opposite ends of said directional control valve to said tank, or for selectively connecting said source of fluid pressure to one of said pair of opposite ends of said directional control valve, while connecting another of said pair of opposite ends of said directional control valve to said tank; and said control unit having a pair of pilot pressure signal output leads respectively coupled to the solenoids of said pair of solenoid-operated pilot pressure control valves.

6. The electro-hydraulic control system, as defined in claim 1, wherein said control valve arrangement includes a directional control valve and said regenerative flow control arrangement includes a regenerative valve arrangement which is separate from said directional control valve and is mounted adjacent said at least one lift cylinder.

7. A method of controlling dumping of a dump bin carrying a load of material in an arrangement wherein the bin is mounted to a frame for pivoting vertically about a horizontal tip axis established between a lower rear location of said bin and the frame, at least one lift cylinder is mounted between the frame and said bin for pivoting the bin vertically about said tip axis between a lowered horizontal loading position and a fully raised dumping position, comprising the steps of:

a. controlling the flow of pressure fluid to, and return fluid from the lift cylinder for causing extension of said lift cylinder for initially lifting said bin;
b. monitoring only a tip angle of the bin as the bin is lifted;
c. determining the amount of force required to be exerted by said lift cylinder to continue lifting the bin based upon an assumption that the load corresponds to a known correlation of a decrease in the load carried by the bin as the tip angle increases;

d. comparing said amount of force with a predetermined force at which an increase in the speed of extension of said cylinder can be achieved;

e. establishing a regenerative flow path between opposite ends of said cylinder only when the amount of force equals said predetermined force, to thereby increase the speed of extension of said lift cylinder and, hence, the speed at which said bin is dumped.

8. An electro-hydraulic control system for controlling an operation of at least one hydraulic lift cylinder coupled for tipping a loaded bin upwardly about a pivot axis for dumping a load from the bin, the control system comprising: a source of pressure fluid; a fluid tank; a control valve arrangement coupled for controlling the flow of pressure fluid to, and return fluid from, said at least one lift cylinder and including a regenerative flow control arrangement responsive to a regenerative flow signal for coupling the rod end of the at least one hydraulic lift cylinder to the head end when the cylinder force required to continue movement of the bin to a fully dumped position decreases to a preselected cylinder force which is substantially less than an initial cylinder force required for lifting said bin at a beginning of a dumping operation; an electronic control unit including a memory containing a stored predetermined bin condition value corresponding to when said cylinder force requirement is equal to said preselected cylinder force; said electronic control unit forming part of an on-board weighing arrangement for determining the weight of a load in said bin, with said predetermined stored bin condition value corresponding to a predetermined weight of a load in said bin that corresponds to when said cylinder force requirement is equal to said preselected cylinder force; and a bin condition sensor arrangement including a bin tip angle sensor, a bin load sensor arrangement and a bin inclination sensor, with said bin load sensor arrangement, bin tip angle sensor and said bin inclination sensor all sending representative signals to said control unit which computes the weight of a load in said bin based on said signals; and said control unit sending a regenerative flow control signal to said control valve arrangement for causing said regenerative flow through said regenerative flow control arrangement in response to the sensed bin condition signal equaling said stored predetermined bin condition value.

9. The electro-hydraulic control system, as defined in claim 8, wherein said preselected cylinder force is a force at which said at least one cylinder is capable of extending at an increased speed during dumping said bin.

10. The electro-hydraulic control system, as defined in claim 9, wherein said control valve arrangement includes a directional control valve and said regenerative flow control arrangement includes a regenerative flow control valve assembly which is separate from said directional control valve and is mounted adjacent to, and is connected to, said at least one bin lift cylinder by fluid lines sized to carry regenerative flow, whereby said fluid lines sized to carry regenerative flow may be relatively short in comparison to a situation where the regenerative flow control valve assembly is remote from the at least one bin lift cylinder.

11. The electro-hydraulic control system, as defined in claim 9, wherein said control valve arrangement includes a directional control valve selectively shiftable among neutral, power up and power down positions for controlling flow between a first actuator port and supply and drain ports, and between a second actuator port and the supply and drain ports, and wherein said regenerative flow control valve assembly comprises first and second, normally closed solenoid-operated poppet valves, with only said second solenoid-operated poppet valve being energized and shifted to an open position directing return fluid from a rod end of said at least one lift cylinder to the second actuator port of said directional control valve, which is connected to the drain port of said directional control valve, when said directional control valve is shifted to the power up position, wherein the first actuator port is connected to the supply pressure port, and with only said first solenoid-operated poppet valve being energized and shifted to establish a path for regenerative flow to occur between said rod end and said head end of said at least one bin lift cylinder, with said directional control valve remaining in said power up position.

* * * * *